US010110911B2

(12) United States Patent
Wang et al.

(10) Patent No.: US 10,110,911 B2
(45) Date of Patent: Oct. 23, 2018

(54) PARALLEL MEDIA ENCODING

(71) Applicant: CISCO TECHNOLOGY, INC., San Jose, CA (US)

(72) Inventors: Qi Wang, Shanghai (CN); Scott C. Labrozzi, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 596 days.

(21) Appl. No.: 14/538,273

(22) Filed: Nov. 11, 2014

(65) Prior Publication Data

US 2016/0134881 A1 May 12, 2016

(51) Int. Cl.
*H04N 19/436* (2014.01)
*G06F 9/455* (2018.01)
*H04N 19/517* (2014.01)
*H04N 19/119* (2014.01)
*H04N 19/139* (2014.01)
*H04N 19/177* (2014.01)
*H04L 29/06* (2006.01)
*H04N 19/40* (2014.01)

(52) U.S. Cl.
CPC ....... *H04N 19/436* (2014.11); *G06F 9/45558* (2013.01); *H04L 65/4084* (2013.01); *H04L 65/605* (2013.01); *H04L 65/607* (2013.01); *H04N 19/119* (2014.11); *H04N 19/139* (2014.11); *H04N 19/177* (2014.11); *H04N 19/40* (2014.11); *H04N 19/517* (2014.11); *G06F 2009/4557* (2013.01)

(58) Field of Classification Search
CPC .................................................. H04N 19/436

USPC ..................................................... 375/240.02
See application file for complete search history.

(56) References Cited

U.S. PATENT DOCUMENTS

| 8,752,112 B2 | 6/2014 | Krasic et al. |
| 8,775,648 B1 | 7/2014 | Cassidy et al. |
| 2006/0072841 A1* | 4/2006 | Terao ............... G06T 9/007 382/240 |

(Continued)

FOREIGN PATENT DOCUMENTS

| WO | WO 2014/062722 A1 | 4/2014 |
| WO | WO 2014/126714 A1 | 8/2014 |

OTHER PUBLICATIONS

Yong He, et al., "MPEG-4 Based Interactive Video Using Parallel Processing", Publication, The Hong Kong University of Science and Technology, Publication Date 1999; 8 pp.

(Continued)

*Primary Examiner* — Christopher S Kelley
*Assistant Examiner* — Asmamaw G Tarko
(74) *Attorney, Agent, or Firm* — Merchant & Gould P.C.

(57) ABSTRACT

A system can include a controller that employs an application interface to create and manage resources for encoding or transcoding an input media asset. The resources can include a media splitter to divide the input media asset into a plurality of media blocks. A media analyzer can analyze separately media content in each of the media blocks to determine respective encoding parameters for each of the media blocks based on a complexity for each of the respective media blocks. A plurality of encoders can encode or transcode, in parallel with each other, each of the media blocks based on the determined encoding parameters to generate an encoded media file in a target format.

20 Claims, 5 Drawing Sheets

(56) References Cited

U.S. PATENT DOCUMENTS

| | | |
|---|---|---|
| 2010/0083303 A1 | 4/2010 | Redei et al. |
| 2011/0060792 A1* | 3/2011 | Ebersviller ............ H04N 19/46 709/203 |
| 2012/0147958 A1* | 6/2012 | Ronca ................... H04N 19/124 375/240.16 |
| 2012/0148208 A1* | 6/2012 | Hozumi ............... G11B 27/034 386/201 |
| 2012/0184373 A1* | 7/2012 | Kim .................... H04L 65/4084 463/42 |
| 2013/0019149 A1 | 1/2013 | Spencer et al. |
| 2013/0308436 A1 | 11/2013 | Li |
| 2014/0130106 A1 | 5/2014 | Syed et al. |
| 2014/0245440 A1* | 8/2014 | Reynolds .............. G06F 21/563 726/23 |

OTHER PUBLICATIONS

Dr. Dobb's, The World of Software Development, "Optimizing Video Encoding using Threads and Parallelism, Designing and Implementing a Multithreaded H.264 Encoder", dated Jun. 11, 2010, Article, retrieved from http://www.drdobbs.com/articie/print?articleId=225600370&siteSectionName=parallel; retrieved on Jul. 23, 2014; 5 pp.

Ping Li, Bharadwaj Veeravalli, and Ashraf A. Kassim, "Design arid Implementation of Parallel Video Encoding Strategies Using Divisible Load Analysis", IEEE Transactions on Circuits and Systems for Video Technology, vol. 15, No. 9, Sep. 2005; pp. 1098-1112.

* cited by examiner

PARALLEL MEDIA ENCODING

TECHNICAL FIELD

This disclosure relates to parallel encoding of media.

BACKGROUND

Video encoding is a time consuming and computationally intensive task. For example, it can take a few hours to encode a high-definition (HD) movie as H.264 or H.265 format. Most existing video encoding algorithms divide complete video into different groups of picture (GOPs), and use motion estimation and motion compensation algorithms to calculate motion vectors, then calculate the differences of adjacent pictures and encode them to achieve maximum compression ratio. Thus, one video's encoding time heavily depends on the duration of the video. In some cases, multi-pass encoding, also known as 2-pass or 3-pass encoding, is adopted to achieve better compression quality and accurate rate control; however, this increases the duration of time to complete the encoding process.

DESCRIPTION OF EXAMPLE EMBODIMENTS

Overview

Figure 1:
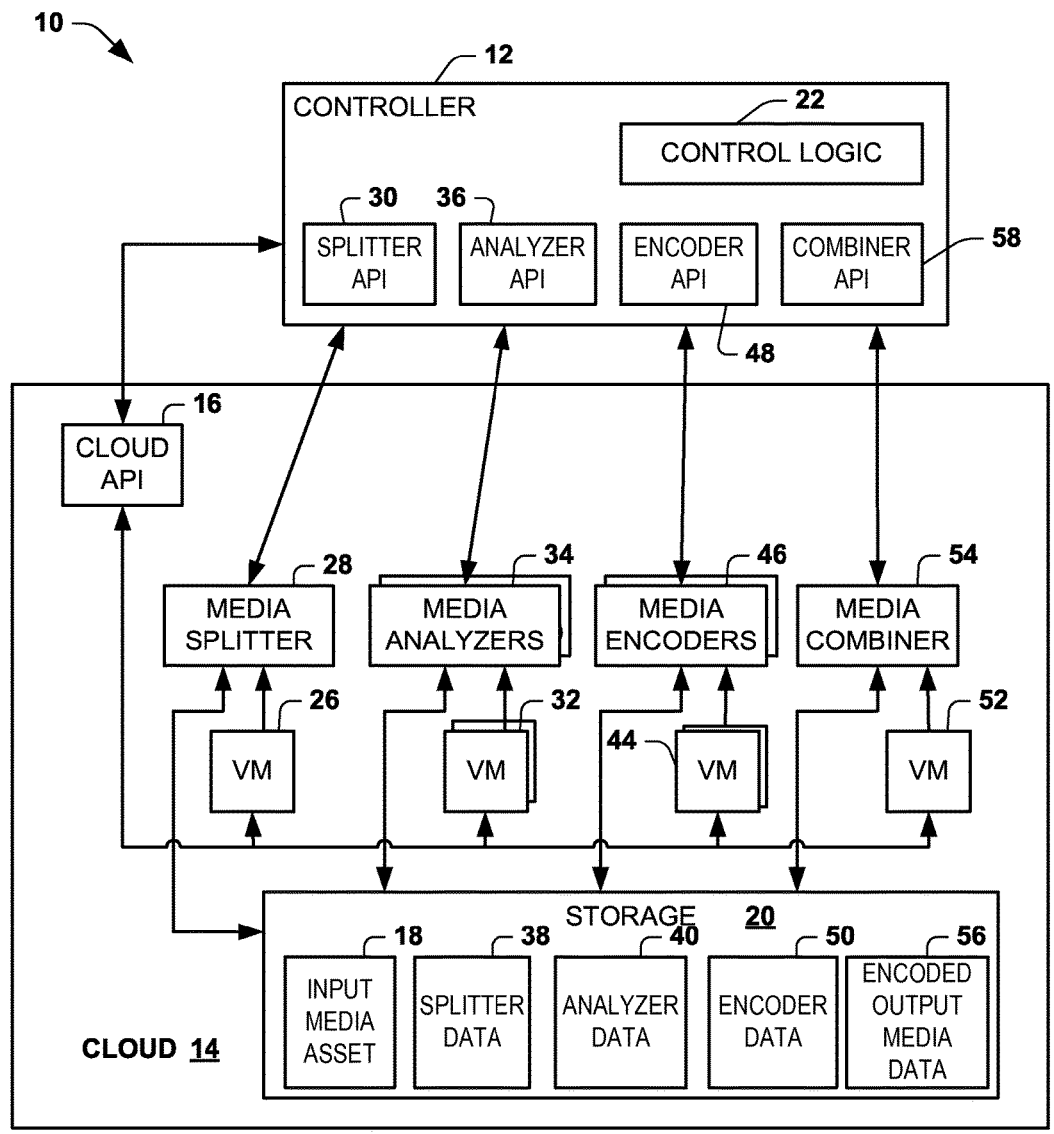
FIG. 1 depicts an example of a system to encode or transcode media data.

This disclosure relates parallel transcoding or encoding of a media asset.

As one example, a system can include a controller that employs an application interface to create and manage resources for encoding or transcoding an input media asset. The resources can include a media splitter to divide the input media asset into a plurality of media blocks and a media analyzer to analyze separately media content in each of the media blocks to determine respective encoding parameters for each of the media blocks based on a complexity for each of the respective media blocks. A plurality of encoders can encode or transcode, in parallel with each other, each of the media blocks based on the determined encoding parameters to generate an encoded media file in a target format.

As another example, a method can include splitting an input media asset to provide split data that identifies a plurality of media sub-assets derived from the input media asset. The method can also include analyzing media content in each of the plurality of media sub-assets to provide analyzer data, the analyzer data including a divide location and encoding parameters based on at least one of a scene change location and a complexity determined for each of the plurality of media sub-assets. The method can also include encoding each of the plurality of media sub-assets separately and in parallel with each other, based on the analyzer data and parameters in an encoder request to encode or transcode the input media asset, to provide a plurality of encoded media blocks. The method can also include combining the plurality of encoded media blocks to provide an encoded media file in a target format for the input media asset.

As yet another example, an apparatus includes a memory device that includes instructions executable by one or more processing units. The one or more processing units access the memory device to execute the instructions and implement a controller. The controller can include control logic that executes an encode workflow to control encoding or transcoding an input media asset in response to an encode request. A cloud application interface can manage resources in a computing cloud. A splitter application interface invokes a media splitter deployed in the computing cloud to divide the input media asset and identify a plurality of media assets according to divide location information provided by the controller. An analyzer application interface can invoke a plurality of media analyzers deployed in the computing cloud to analyze media content, each of the plurality of media analyzers analyzing media content in a given one of the plurality media assets to provide corresponding analysis data specifying at least one of a location for further subdividing or encoding parameters for the encoding or transcoding of the given one of the plurality of media assets. An encode application interface can invoke a plurality of media encoders deployed in the computing cloud. Each of the plurality of media encoders can encode or transcode each of the plurality of media assets separately and in parallel with each other of the media encoders, based on the analysis data and parameters in the encode request, and provide a plurality of encoded media blocks.

Example Embodiments

As an example, cloud resources can be provisioned as virtual machines to provide one or more media splitters to divide the media asset into one or more media blocks. Cloud resources can also be provisioned to manage and/or create one or more media analyzers. When multiple media analyzers are utilized, each of the media analyzers can separately analyze media content in each of the respective media blocks. For example, each of the analyzers can analyze media content of the respective media blocks in parallel to intelligently identify one or more divide locations. If the media analyzer determines that splitting is desired at the identified divide locations and/or based on the complexity of the content of the respective blocks, appropriate cloud resources can be provisioned to create one or more media splitters to split the identified media blocks into corresponding media sub-assets based on the analysis data. Cloud resources can be utilized to analyze each of the corresponding sub-assets and the media splitting and analysis can continue in a recursive manner until the resulting sub-assets are specified as being ready for encoding and associated encoding parameters have been generated.

To encode or transcode the input media asset, cloud resources can be provisioned for creating a plurality of media encoders that can operate in parallel on each of the identified media sub-assets and encoding parameters that have been provided based on the cooperation between the media splitter and the respective media analyzers. In this way the preceding analysis can be utilized to facilitate the encoding of each of the respective media blocks in parallel. The encoded media blocks can be stored in memory and aggregated to provide the encoded media asset.

FIG. 1 depicts an example of an encoding system 10. The system 10 includes a controller 12 to manage and control resources (e.g., nodes) for implementing the elastic parallel encoding process disclosed herein. In some examples, the resources reside in a cloud 14. In other examples, the resources could be implemented as a fixed pre-allocation of nodes adapted to perform the requisite processing tasks (e.g., transcoding or encoding). Thus the controller 12 can manage one or nodes to perform the work associated with the transcoding or encoding of the media asset to provide a final encoded media asset in a target format that can be played out or stored in memory for later playout. The target format can be the same format or a different format from a format of the input media asset. The encoded media asset can be provided for playout or stored in an origin or other server for subsequent playout. In some examples, such as for adapted bit rate programming, the input media asset can be encoded to a plurality of bit rates.

As used herein, parallel refers to different applications executing concurrently at least at some stage of the encode process. For example, parallel encoding in the cloud for different media sub-assets can begin and/or end at different times (e.g., in an asynchronous manner), and the combiner can re-assemble the sub-assets in a proper sequence based on timing metadata associated with each sub-asset. The system 10 can be implemented within a given device, such as an encoder or transcoder product, digital content managers, content delivery server, general purpose computer or the like.

As an example, the controller 12 employs a cloud application interface (API) 16 to invoke cloud resources to manage and/or (if needed) create virtual machines to execute instances of software resources for implementing the encoding workflow with respect to an input media asset 18. For example, communications between the controller 12 and resources in the cloud 14 can occur using a predetermined protocol over a network, which could be a serial connection, an internet protocol (IP) network, a token ring network or other form of communications. In the computing cloud 14, each virtual machine that the controller 12 creates thus can be designed to run a single program, such as a respective video splitter 28, media analyzer 34, media encoder 46 or combiner 54. The cloud 14 can be implemented according to a variety of cloud platform architectures, such as including Openstack, Nova/Cinder, VMWare VCenter, Amazon NC2 and the like.

The input media asset 18 can be stored in a common data storage 20 which can be part of the cloud 14, as shown. In other examples, the input media asset could be stored in other memory storage that is external to but accessible by cloud resources. The input media asset, for example, can be a source media file, such as can be an uncompressed high definition or standard definition file. In other examples, the input media asset 18 can be a compressed file format, such as according to a moving picture experts group (MPEG) or another compression format. In some examples, the input media asset can be received as streaming media includes a series of digital media blocks. In either example, the input media asset 18 includes digital data representing a series of pictures (e.g., images) and ancillary data, such as can include audio data, subtitles, and related metadata associated with each picture.

The controller 12 can invoke the cloud resources via the cloud API 16 in response to a command to encode or transcode the input media asset 18. The command can be provided by another application or in response to a user input. The controller 12 control logic 22 programmed to execute an elastic parallel encoding workflow to manage resources implemented in the cloud 14 (e.g., see FIG. 6). The control logic 22 can also include business logic that can be utilized for controlling the resources in the cloud 14 via the cloud API 16. For example, the business logic can dictate the available of cloud resources according to a services contract for a given subscriber (e.g., that provided the command to encode the media asset 18).

By way of example, in response to receiving the encode command for the input media asset 18, the control logic 22 employs the cloud API 16 to create a media splitter virtual machine 26 and deploy one or more media splitters 28. The controller 12 can employ a splitter API 30 to communicate with the media splitter, such as to provide instructions for splitting the input media asset into two or more sub-assets. For example, the control logic 22 is programmed to command the media splitter 28 via the splitter API 30 to divide the input media asset into two or more corresponding media sub-assets. For example, the initial divide command can initially cause the media splitter 28 to split the input media asset into two substantially equally sized sub-assets which can be at an arbitrary or specified divide location. In some cases, the initial split by the media splitter 28 can be maintained as part of the corresponding media blocks that are provided for transcoding, for example. In other examples, the initial split can be transitory, and provided to enable parallel content analysis performed by a plurality of the media analyzers 34.

As another example, prior to splitting the media asset 18, the control logic 22 can employ the cloud API 16 to create one or more analyzer VMs 32 to deploy one or more media analyzer 34 in response to receiving the encode command for the input media asset 18. In this initial stage of content analysis, each media analyzer 34 is programmed evaluate the media content and intelligently identify one or more divide locations. That is, the initial divide locations can be intelligently identified by one or more media analyzers 34 based on the media content and the splitter 28 can generate splitter data 38 to define divide locations and associated media metadata.

Instead of causing the input media asset 18 to be physically subdivided into corresponding files associated with each sub-asset, the media splitter 28 can virtually split the input media asset by identifying corresponding start time and end time as well other associated metadata that can be utilized to define each of the sub-assets for further analysis and processing in the encode workflow executed by the control logic 22. The media splitter 28 thus can return to the controller 12, via the splitter API 30, splitter data specifying a range for each of the sub-assets, such as can be identified by corresponding time stamps, and associated metadata. It is understood that the media splitter 28 can subdivide each input media asset 18 (or already identified media sub-assets) into two or more such sub-assets. In response to the splitter data 3 being returned to the controller 12, the controller can command the media splitter and its associated virtual machine to be deleted from the cloud 14 or the controller can release the virtual machine to the resource pools for subsequent reuse.

Also in response to the splitter data, the controller 12 can further employ the cloud API 16 to create a plurality of media analyzer VMs 32 or to reuse idle VMs to invoke respective media analyzer applications 34. For example, the number of media analyzers deployed is based on (e.g., proportional or equal to) the number of identified media sub-assets into which the input media data has been divided at this stage. The controller 12 can in turn employ an analyzer API 36 to invoke each of the media analyzers 34 that is deployed in the could to analyze separately and in parallel the content of a respective media sub-asset. That is, each media analyzer 34 can be invoked for analyzing a different one of the respective media assets. For example, each media analyzer 34 analyzes in parallel encoding parameters according to the respective content in each of the media sub-assets that have been identified based on the splitter data 38. Each media analyzer 34 can provide analysis data 40 to specify further subdivisions within the respective media sub-asset being analyzed.

By way of example, each of the media analyzers 34 can identify the further subdivisions as corresponding to scene change locations identified based on analyzing the media content for a respective media sub-asset. In some examples, a given scene change location can be selected from a plurality of scene change locations that might exist at different temporal locations distributed in the media sub-asset. The selected scene change location for identifying a given subdivision can be selected based on one or more of a complexity of the media sub-asset or other criteria to facilitate sub-asset encoding of the respective media sub-asset. Additionally, the media analyzers 34 can provide analyzer data 40 representing the selected scene change location(s) and encoding parameters (e.g., including buffer utilization constraints). The analyzer data 40 can be stored in the data storage 20 and returned to the controller via the analyzer API 36.

If a corresponding location has been identified for further subdividing the media sub-asset, the results of such identification can be utilized by to the controller 12 for invoking additional splitting of one or more media sub-assets into two or more respective blocks. For example, the controller 12 can further provide the identified subdivision location to create a virtual machine 26 and one more associated media splitters 28 for further sub dividing the media sub-asset into corresponding media sub-asset blocks based on the analysis data. The media analysis thus can provide feedback to the controller for performing additional splitting. For example, if the media analyzer 34 determines that further splitting is desired at identified divide locations and/or based on the complexity of the content of the respective blocks, the controller can provision appropriate cloud resources to employ one or more media splitters to split the identified media blocks into corresponding media sub-assets based on the analyzer data 40. Thus, the splitting and analysis functions can operate recursively on increasingly smaller media blocks to identify substantially optimal media blocks to facilitate the parallel encoding process. As mentioned, the analyzer data 40 can include encode parameters such as to specify buffer utilization according to the computed complexity of the media blocks resulting from the application of the splitter 28. The corresponding splitter data 38 further can identify the plurality of media blocks by specifying start and stop times for each respective media block (e.g., at scene change locations) that is to be encoded according to the encode parameters specified in the analyzer data 40. For the example of MPEG media, start and stop times can be specified by a presentation time stamp (PTS) in the metadata provided by the splitter 28.

In some examples, the media analyzer 34 serially analyzes the content in the input media data asset 18 to locate scene changes and to determine complexity for blocks of the input media asset between adjacent pairs of scene change locations. The analyzer 34 can thus provide information identifying one or more divide locations for dividing the asset based upon the complexity and requisite buffer utilization. The serial analysis in this manner can be part of a single pass analysis through content of the input media asset. In other examples, each media asset or sub-asset processed by the media analyzer can be analyzed in a serial type manner.

As mentioned, the analysis data 40 from each of the one or more media analyzers 34 can be fed back to drive the media splitter 28 and further media analysis as a recursive process. By way of further example, each given media analyzer 34 can specify divide locations based on content analysis, which can include analysis of encode parameters (e.g., buffer utilization), to provide corresponding analysis data 40. The divide locations in the media analysis data 40 can be returned to the control logic via the analyzer API 36, which can be employed by the control logic to create a media splitter VM 26 and deploy a splitter to subdivided the current media asset or sub-asset into corresponding media blocks at the identified divide locations and generate associated metadata. The control logic can create a VM and deploy a respective media analyzer 34 to analyze each respective sub-asset separately in parallel. The control logic can continue the recursive process of further sub-dividing and then analyzing each resulting media block until the divided media blocks are determined by the controller to have a sufficiently low complexity level or otherwise can be encoded efficiently, as specified in encoding constraints that are generated for each media block as part of the analysis data 40. The resulting analysis data 40 for each of the specified media blocks can be stored in the storage 20 and provided to the controller via the analyzer API 36 for subsequent processing. The controller 12 can delete the media analyzer virtual machines 32 in response to successful completion of the analysis for a respective media block. In other examples, the virtual machines can be released to the pool of cloud resources for subsequent use (e.g., VMs can be recycled). That is, the controller 12 can manage the resource pool, including creation, deletion and recycling of VMs.

After one or more media sub-assets have been identified for encoding, the control logic 22 employs the API 16 to elastically implement parallel encoding of the media blocks that have been identified by the cooperative operation of the media splitter 28 and media analyzers 34. For example, the control logic 22 can employ the cloud API 16 to create and/or manage a plurality of encode virtual machines 44 or to reuse idle VMs from the available pool of software resources corresponding to the plurality of media encoders 46. The control logic 22 thus commands each of the plurality of media encoders 46 provisioned in the cloud via an encoder API 48 to execute separately and in parallel for encoding a respective media sub-asset to one or more formats based on encoding parameters provided with the original encode request and encoding constraints for the respective sub-asset.

By way of example, each media encoder 46 can be invoked in the cloud 14 to read a respective one of the media sub-assets from the input media asset 18 in the storage 20, which has been identified as a result of the splitting and media analysis, according to the splitter data 38 and analysis data 40 for encoding or transcoding the respective media block. For instance, each of the media encoders can be provided references to the start and stop times (e.g., PTS) for a respective media block as well as encode constraints that specify an associated buffer utilization level for the encode process that is to be performed to convert the respective media block to a desired target format. Each of the plurality of parallel media encoders 46 further can employ a corresponding encode template to control the encode process based on corresponding video encoding parameters (e.g., video codec, one or more bit rates, resolution, frame rate, and the like), which can be specified in the encode request received by the controller 12. The media encoders 46 can also include one or more audio encoders that employ an audio codec to convert the audio data in the input media asset 18 into one or more target audio formats and/or languages according to the encode request. Since audio encoding is less complicated than encoding video, the audio encoder(s) can be deployed in the cloud 14 (e.g., concurrently with or separately from the video encoding) to convert the audio from the media asset 18 into one or more audio output files in respective target formats.

Each of the media encoders 46, including audio and video encoders, can provide the encoded media files as encoder data 50 in the storage 20 and return the status information to the controller via the encoder API 48. Once it is determined that the encoding process is complete, the control logic 22 can employ the cloud API to delete or release the encoder virtual machine to free up computing resources in the cloud 14. Since the encoding is performed on respective media blocks in parallel, based on analysis data 40 and splitter data 38 and according to requested encoding parameters, the overall encoding time can be reduced significantly regardless of whether it is single or multi-pass encoding. Examples of media encoder software resources that can be implemented in the cloud 14 include the Cisco Videoscape AnyRes VoD available from Cisco Systems, Inc. as well as other content management products from Cisco systems or other vendors.

In conjunction with the creation of the encoder data 50, the control logic 22 of the controller 12 can employ the cloud API to create and/or manage a combiner virtual machine 52 and install a corresponding media combiner 54. The media combiner is programmed to combine the encoded video media files from the encoder data 50 and package them in a corresponding container format, which can specified by the input parameters in the encode request that commanded the controller to initiate the encode process. The control logic 22 can command the media combiner to combine the encoded media data files via a combiner API 58 according to output requirements specified in the encode request received by the controller 12. The media combiner 54 thus provides an encoded output media data 56 that can be provided to the storage 20. For example, the combiner 54 can generate an MPEG media container, an Ogg media container or the like to store the encoded media (audio and video) for playout. The encoded output media data 56 can be provided to an origin server or another storage location for use by a content provider to enable playout of the encoded media asset.

In some examples, the media combiner 54 can create containers of adaptive bitrate (ABR) data in one or more ABR format for streaming of the media asset in one or more ABR protocol. Examples of ABR protocols that can be implemented by the encoders 46 to generate ABR content for streaming each rendition of input media asset 18 can include HTTP Live Streaming (HLS), HTTP adaptive streaming (HAS), Adobe Systems HTTP dynamic streaming, Microsoft smooth streaming, MPEG dynamic adaptive streaming over HTTP (DASH) or other streaming protocols. The ABR format and bitrates of the encoded media can be specified in an ABR profile provided with the encode request. Parameters for the ABR profile can include codec, codec profile, chunk size and chunk boundary requirements, video and audio bitrates, width and height, frame rate, and the like. Thus, the media encoders 46 deployed in the cloud can encode each of the identified sub-assets to corresponding fixed or variable sized chunks of media encoded to a plurality of different bitrates. The chunk size for ABR encoded data is less than or equal to the duration of the sub-assets provided to each parallel media encoder node 46. As used herein, a chunk of content can refer to any discrete number of bits of content that can be independently encoded and decoded. In the context of media analysis for ABR encoding, the media analyzers 34 further can identify subdivisions of the media asset based on analyzing content to determine how a given subdivision affects quality, such as in relation to buffer utilization and ABR segment boundary requirements. That is, the media analyzers 34 contemplate both the ABR segment boundaries as well as making efficient use of encoding buffers. For ABR streaming, each encoder 46 that is deployed further can include an arrangement of parallel encoder nodes where each is programmed to encode the same media sub-asset to a different bitrate. The combiner 54 thus aggregates the encoded media at the desired bitrates into one or more containers to support streaming of the encoded media.

In view of the foregoing, the controller 12 thus can elastically create and/or manage many virtual machines or other resources (e.g., in a non-cloud based implementation) that can be implemented in parallel for one or more stages of the encoding workflow process. For a given cloud platform 14, the controller 12 thus is programmed with a corresponding cloud API 16 to access, control and manage the cloud resources. Additionally, the controller 12 includes a set of application-related APIs 30, 36, 48 and 58 for implementing the cloud-based applications deployed in the cloud 14 and available to the controller 12 for implementing the encode workflow. Through such APIs, the system can be adapted to utilize virtually any encoding product and further can be updated easily with next generation products. Thus, the system 10 can achieve faster and higher quality encoding than traditional approaches, including multi-pass encoding and transcoding.

Figure 2:
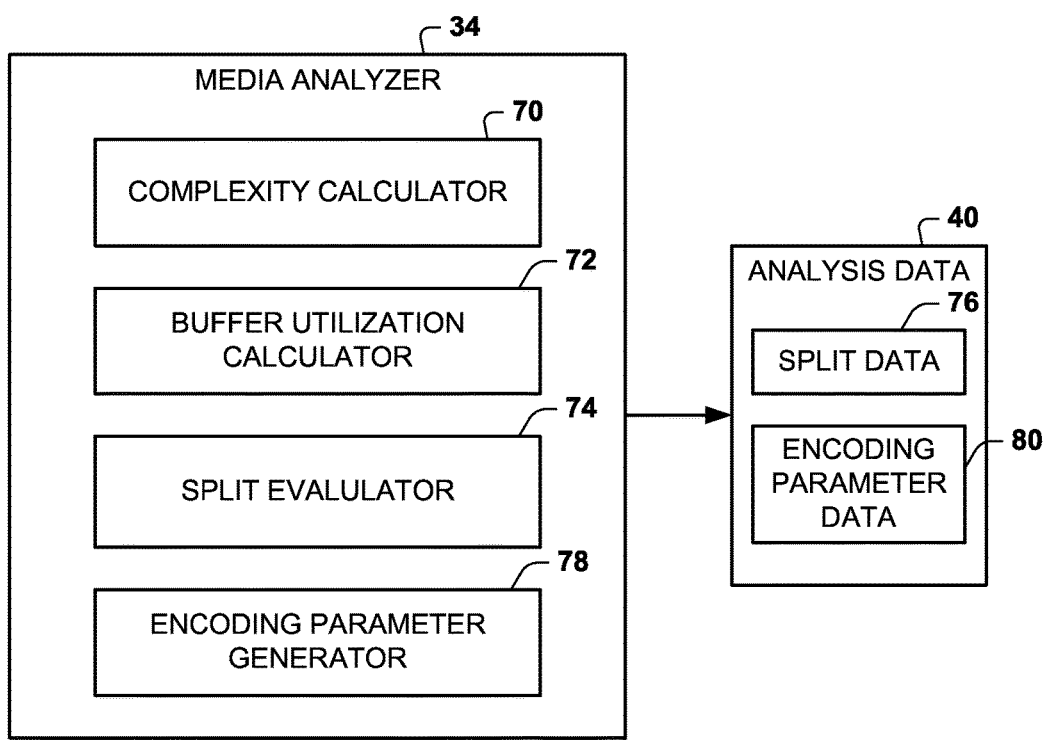
FIG. 2 illustrates an example of a media analyzer node that can be part of the system of FIG. 1.

FIG. 2 depicts an example of a media analyzer 34 that can generate analysis data 40, such as disclosed in the system 10 of FIG. 1. The media analyzer 34 is programmed to analyze content for an identified block of media data such as can be identified by a media splitter (e.g., media splitter 28 of FIG. 1). The media analyzer 34 can include a complexity calculator 70. The complexity calculator 70 can compute a value representing the complexity of a block of media data. The complexity calculator 70, for example, computes complexity based on an amount of motion or changes between respective frames of the video, which further can correlate to an amount of buffer utilization. Additionally or alternatively, the complexity calculator 70 can computes complexity (e.g., spatial complexity) within one or more frames. The media analyzer 34 can also include a buffer utilization calculator 72 to compute buffer utilization levels for encoding process for a given block of media based on the computed complexity for a block of media. The buffer utilization calculator thus can specify buffer input/output levels for a corresponding encoding process that is to be performed with respect to an identified media block. For example, once the complexity calculator determines an indication of complexity and associated buffer utilization has been assigned to a corresponding media block, subsequent analysis on other blocks can be facilitated. As a result of specifying the buffer utilization in encode parameters for a plurality of discrete media blocks, different parallel encoders (e.g., encoders 46) can utilize different amounts of buffer storage during encoding. For example, encoding of more complex content can use more encode buffer storage, whereas content determined to be less complex can use less buffer storage. The complexity and corresponding buffer utilization constraints thus can be stored as encoding parameter data 80 in the analysis data 40. As part of the recursive process mentioned above, the complexity and corresponding buffer utilization constraints can be utilized to enable splitting of the media asset into media blocks along the lines of content complexity as well as set appropriate buffer utilization levels for each parallel encoding process that is implemented on such media blocks.

A split evaluator 74 thus can be utilized to evaluate media divide locations for a given block of media based on the complexity computed by the complexity calculator 70 as well as buffer utilization constraints determined by the buffer utilization calculator 72. The split evaluator 74 further can identify scene change locations for use in identifying where to divide the respective media asset that is being processed. The analysis of complexity and associated buffer utilization constraints for a duration of media content between identified scene changes can be utilized to select scene change locations that correspond to divide locations for a given block of media. The media analyzer 34 can provide split data 76 as part of the analysis data 40 specifying complexity-driven content-based divide locations for the media asset. The split data 76 thus can be utilized by media splitter (splitter 28 of FIG. 1) to split the media asset to best reflect scene changes and complexity of content between such scene changes.

An encoding parameter generator 78 can be utilized to generate the encoding parameter data 80 based upon the computed buffer utilization and complexity for a given media asset block. For example, the encoding parameter data 80 can include buffer utilization input/output levels for a given media asset block, which given media asset block is identified by programmatically associated split data (e.g., specifying start and stop timestamps) 76. Since each parallel encoder operates separately on the respective media block, the encoded parameter data 80 provided by the media analyzer 34 can facilitate the overall encoding process based on a relative complexity between the respective blocks that are being encoded in parallel.

Figure 3:
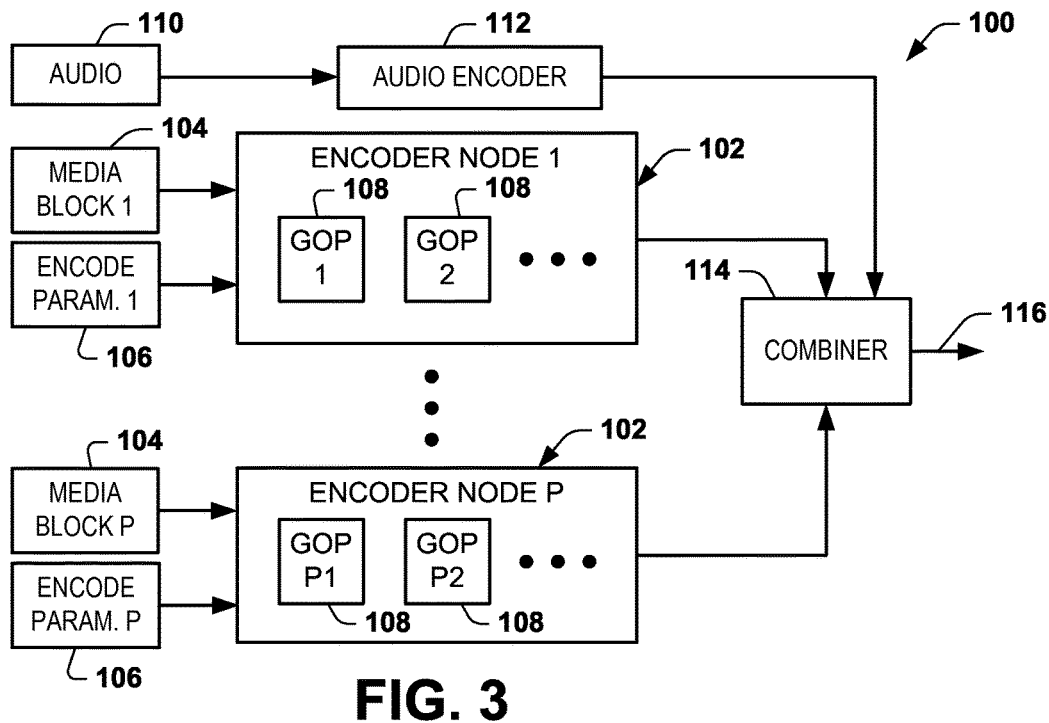
FIG. 3 depicts an example of an encode node that can be part of the system of FIG. 1.

FIG. 3 depicts an example of a parallel encoder 100 that can elastically encode blocks of an input media asset in parallel. In the example of FIG. 3, the encoder system 100 includes a plurality of encoder nodes 102, demonstrated as encoder node 1 through encoder node P, where P is a positive integer denoting the number of encoder nodes that have been created elastically for encoding the input media asset. Each encoder node is configured to as a video encoder for encoding input video corresponding to a given media block demonstrated at media block 1 to media block P, which in aggregate provide an input media asset. Thus, each encoder 102 is invoked for parallel encoding of a respective media block 104. Each encoder 102 can be implemented as instructions executable in the computing cloud (e.g., cloud 14) by one or more processing units, as disclosed herein. Each of the encoder nodes 102 thus can provide a set of APIs to enable a controller to control the encoding process that is being implemented on each media block 104.

The controller further can provide encode parameters 106 via the set of APIs to further constrain the encoding process implemented by each encoder 102. For example, the encode parameters 106 can include an indication of input and output buffer utilization levels for each respective encoder to facilitate the encoding process. The encode parameters can also include other encode parameters specified in an encode request (e.g., bitrate, codec, format, resolution and the like). Each media block 104 that is being encoded can be specified by reference to a start time and stop time and associated metadata for the media block to enable the encode process, while a single media file is stored in a common storage (e.g., storage 20 of FIG. 1) that is shared by each of the distributed parallel encoders 102 to reduce storage requirements for the encode process. Each encoder 102 thus can encode a respective media block 104 independently of each other encoder. The buffer utilization parameters further can help constrain the encode process by specifying buffer resources according to the complexity and other content that has been analyzed (e.g., by media analyzer 34) and provided in the encode parameters 106. Each of the encoders can provide a corresponding encoded media file according to an encoder template that is implemented thereby.

As a further example, each encoder can operate on corresponding groups of pictures (GOPs) 108 in each of the respective media blocks. As disclosed herein, each of the media blocks can be of different durations and complexity, which can be determined by the analysis and the video splitter applications as part of a pre-analysis stage. Each of the GOPs 108 can correspond to fixed or variable length chunks in a sequence of successive pictures (e.g., an arrangement of I frames, P frames and/or B frames) corresponding to the respective media block 104 that is being encoded.

Also demonstrated in FIG. 3, audio data 110 associated with the input media asset represented by the media blocks 104 can be encoded to an appropriate audio format via an audio encoder 112. The audio encoding can operate in parallel separately from the video encoding process implemented by the parallel encoders 102. A combiner 114 can combine each of the respective encoded media blocks and encoded audio and generate a corresponding output media file 116 in a container format according to the request specifying encode parameters and target format. The output media file 116 can be provided to an origin server or other storage location.

Figure 4:
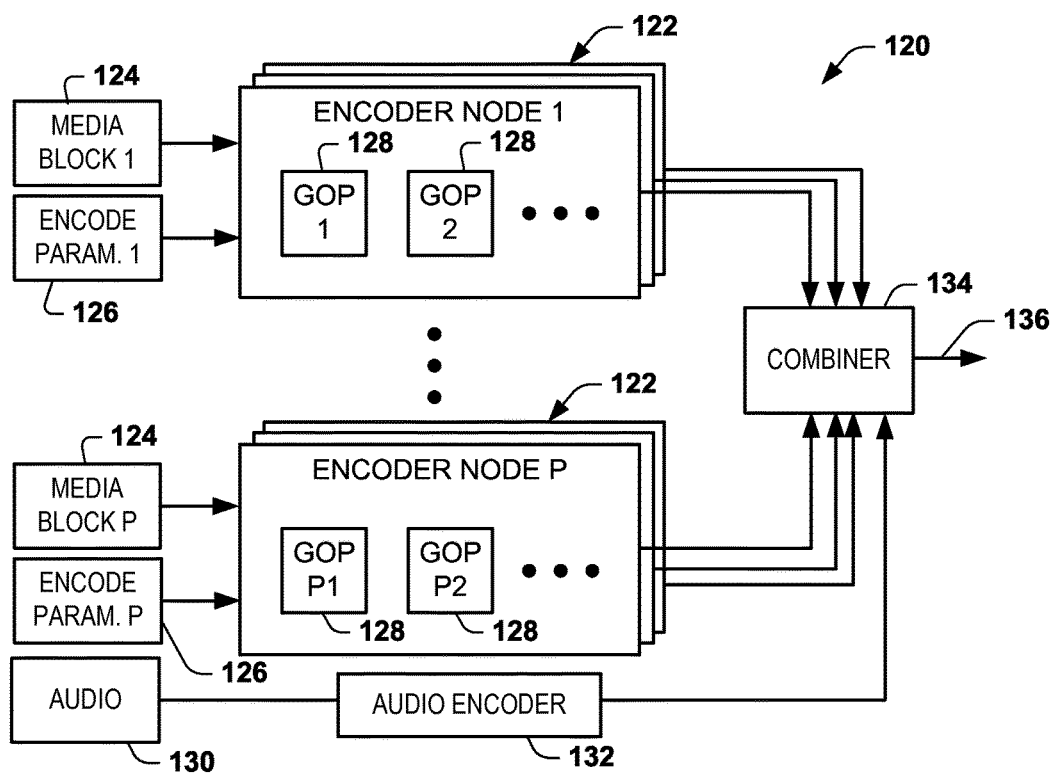
FIG. 4 depicts an example of another encode node that can be part of the system of FIG. 1.

FIG. 4 depicts an example of another encoding system 120 that includes a plurality of parallel encoder nodes 122. In the example of FIG. 4, each encoder node 122 includes a plurality of encoders for encoding respective media block into a plurality of different bitrates, such as can be specified in an ABR profile. Thus, in the example of FIG. 4, encoder parameters 126 specify ABR encoding by a given encoding node for encoding or transcoding a respective media block 124. Thus each of the respective nodes 122 can operate on a respective media block and employ corresponding encode parameters to encode GOPs to corresponding chunks that are synchronized and include media chunk boundaries aligned according to the ABR format being implemented. The bitrate and chunk boundaries for a given ABR format can be specified by the ABR profile in the encode request. For example, each of the encoder nodes 122 includes a plurality of parallel sub-nodes, each programmed to encode the same media block 124 to different bitrates. While in the example of FIG. 4, the ABR subnodes in each encoder node 122 operates is demonstrated as operating on the same media block 124, in other examples, different media blocks can be specifically identified for each subnode at each bit rate of the associated ABR format. In this way the parallelization can be expanded proportional to the number of bitrates defined in the ABR profile, such that each encoder subnode is deployed in the cloud to execute in parallel on a respective media block and receives associated encode parameters for the respective media block. Thus, in this alternative example of ABR encoding, the encoding system would look similar to the example of FIG. 3 in which some of the media blocks 104 may overlap and/or be redundant with other media blocks that are employed for encoding the media to different bitrates.

Similar to as described above, audio data 130 associated with the input media asset, which is represented by the set of media blocks 124, can be encoded or transcoded to an appropriate audio format via an audio encoder 132. There can be one or a plurality of audio encoders operating in parallel to implement different audio codec's, which can be for different ABR bitrates, for example. Since the audio encoding is less computationally intensive compared to video encoding, each one or more audio encoders 132 can operate in parallel and separately from the video encoding process implemented by the parallel encoders 122. A combiner 134 can combine each of the respective encoded media blocks and encoded audio and generate a corresponding encoded output media 136 according to the request specified encoded parameters and format. The output media 136 can be provided to an origin server or other storage location.

Figure 5:
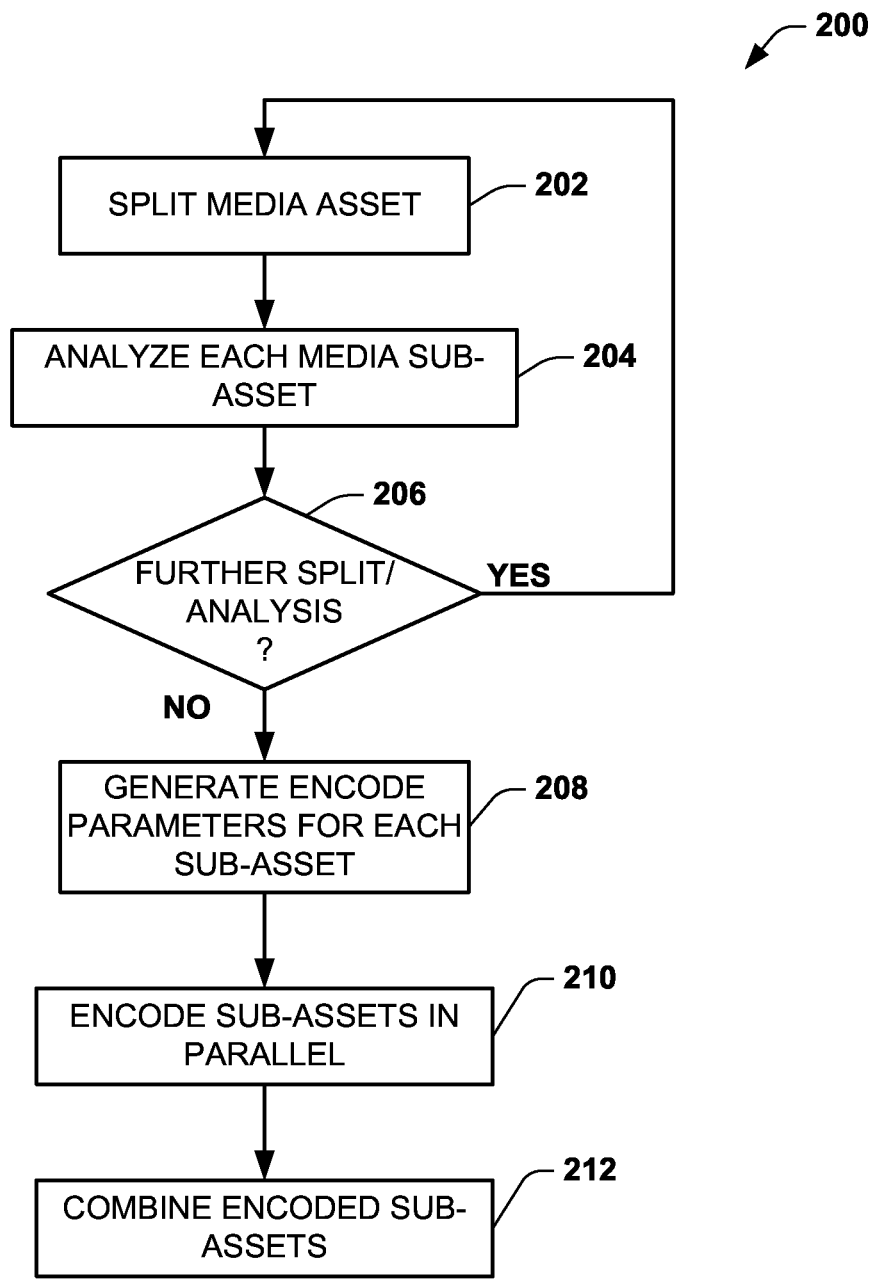
FIG. 5 is a flow diagram depicting a method for parallel encoding of a media asset.
Figure 6:
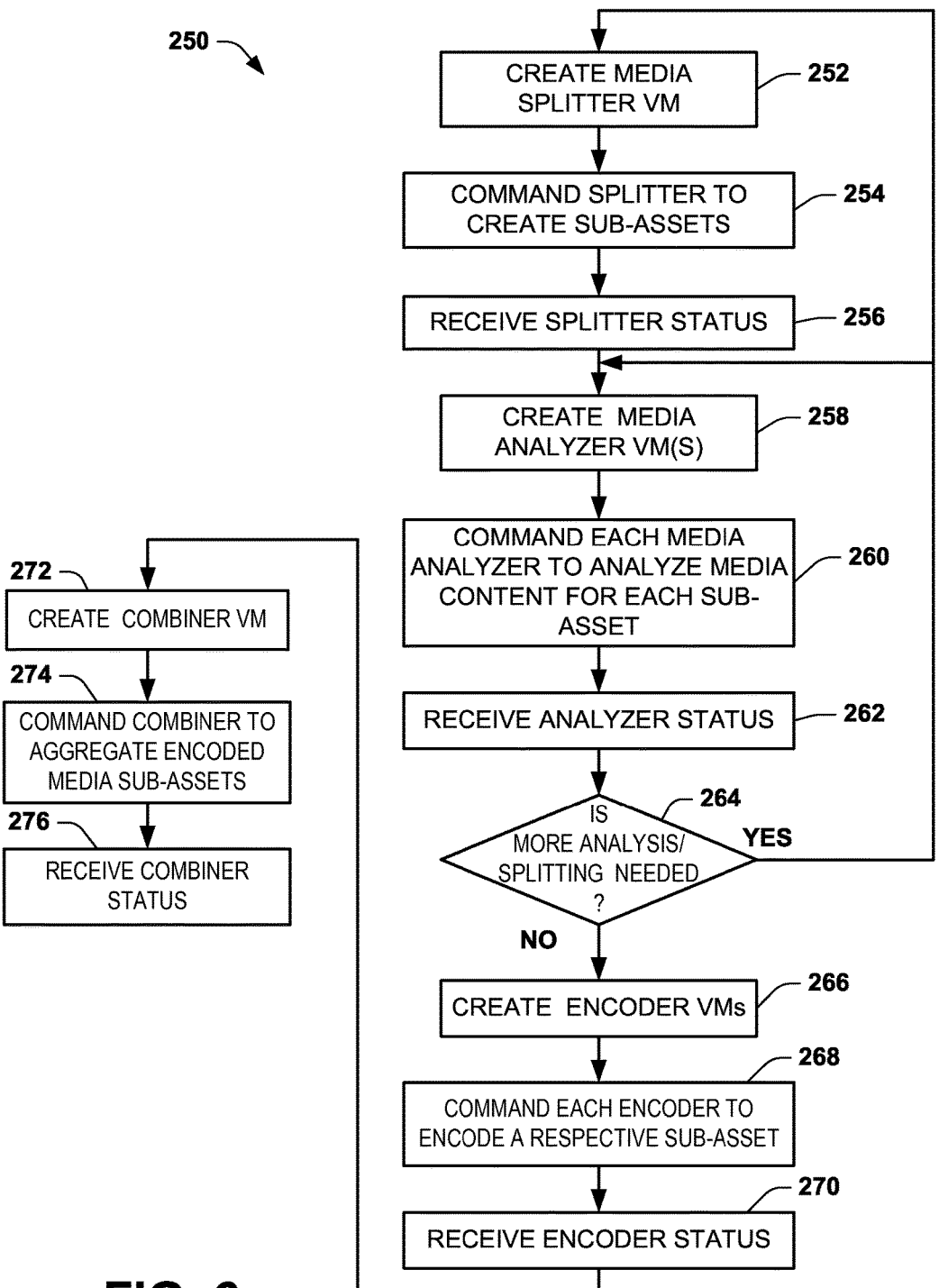
FIG. 6 is a flow diagram depicting a method for managing cloud resources for encoding a media asset.

In view of the foregoing structural and functional features described above, methods that can be implemented will be better appreciated with reference to FIGS. 5 and 6. While, for purposes of simplicity of explanation, the methods of FIGS. 5 and 6 are shown and described as executing serially, it is to be understood and appreciated that such methods are not limited by the illustrated order, as some aspects could, in other examples, occur in different orders and/or concurrently with other aspects from that disclosed herein. Moreover, not all illustrated features may be required to implement a method. The methods or portions thereof can be implemented as instructions stored in a non-transitory machine readable medium as well as be executed by a processing resource (e.g., CPU) of a computer device, for example.

FIG. 5 is a flow diagram of a method 200 for elastic parallel encoding. The method 200 begins at 202, such as in response to a request to encode a given media asset, such as a duration of stored digital media. The encode request can specify encoding parameters and formats associated with the encode process, such as disclosed herein. At 202, the given media asset can be split (e.g., by splitter 28) into two or more media sub-assets. At 204, each media sub-asset can be analyzed (e.g., by a plurality of media analyzers 34 of FIG. 1). For example, the media analysis at 204 can be performed in parallel (e.g., by elastically generated media analyzers 34) for each media sub-asset in a cloud computing environment (e.g., cloud 14). The content analysis at 204 can include an analysis of complexity of a prescribed duration of the media asset as well as an analysis to identify scene changes in the given media asset.

At 206, a determination can be made as to whether further splitting and/or analysis is required. If further splitting or analysis is required (YES), the method can return to 202 to further split a given media asset based upon the analysis at 204. The recursive splitting can create new splits for the media asset intelligently based upon content analysis at 204. The respective sub-assets resulting from the further subdivision of the media asset can be analyzed at 204 (e.g., by elastically provisioned media analyzers) in parallel to determine that further splitting is required. If further splitting is not required, from 206, the method can proceed to 208.

At 208, encode parameters can be generated for each sub-asset and stored in memory. For example, the encode parameters for a given identified media sub-asset can include encode constraints, such as buffer utilization levels for the input and output buffers of the encode process as well as specified start and stop locations that define the respective sub-asset that is to be encoded.

At 210, each of the respective identified media sub-assets can be encoded (e.g., by media encoders 46, 102 or 122) in parallel. The parallel encoding for each respective media sub-asset can include elastically provisioning encode nodes based upon the encode parameters provided in the original encode request and encode parameters provided based on analysis (at 204). The resulting encoded media files can be stored in memory based on the parallel encoding implemented at 210. The encoding at 210 can be implemented by parallel encoders on GOPs provided in each media sub-asset via a set of APIs (e.g., encoder API 48) for each of the respective parallel encoders. At 212, the encoded sub-assets can be combined (e.g., by media combiner 54) and packaged in an appropriate media container for subsequent playout, distribution and/or storage. The combining of encoded media sub-assets at 212 can include a single bitrate of encoding. In other examples, the combined media sub-assets can include a plurality of bitrates established according to an ABR profile.

FIG. 6 is a flow diagram depicting an example of a method 250 implemented by a controller (e.g., controller 12 of FIG. 1) for controlling an elastic parallel encoding workflow as disclosed herein. The method 250 begins at 252 in which a media splitter virtual machine is created in a cloud computing architecture (e.g., cloud 14). The method 250 can begin in response to an encode request for a given media asset. The given media asset can be a raw media file such as a video including one or more audio channels in a prescribed format and related metadata. At 254, the splitter is commanded to create a plurality of media sub-assets. For example, the controller (e.g., 12) implementing the method 250 can employ a splitter API (e.g., API 30) to split the media asset into two or more media sub-assets. The divide locations can be commanded by the controller via the API, such as corresponding to a default split location or as specified based on content-based media analysis performed on the media asset that is being split.

At 256, following completion of the split, the splitter status is received. The splitter status can identify success of the split as well as specify start and stop locations for each of the sub-assets created and associated metadata for each media sub-asset resulting from the split. At 258, one or more media analyzer virtual machines can be created. For example, the controller implementing the method 250 can employ cloud API (e.g., API 16) to create plurality of virtual machines (e.g., VMs 32) and deploy corresponding media analyzers (e.g., media analyzers 34). At 260, each media analyzer that is created at 258 is commanded to analyze media content for each respective sub-asset.

At 262, following completion of the analysis at 260, analyzer status is received. The analyzer status can include data identifying results of the analysis implemented with respect to a given media sub-asset such as can include an identification of one or more additional split locations as well as complexity information for each media sub-asset. At 264, the determination is made as to whether more analysis and/or splitting is needed for a given media sub-asset based upon the analysis status received at 262 for the given media sub-asset. If more analysis and splitting is needed for the given media asset, the method can return to 252 or alternatively, to 258. The loop between 252 and 264 can provide a recursive or sequential process for feeding back results of analyzing the media content to control further division of media sub-assets and subsequent analysis thereof to facilitate subsequent parallel encoding for each of the resulting sub-assets. If no additional splitting or analysis is required at 264, the method proceeds to 266. At 266, one or more encoder virtual machines is created, such as through a cloud API (e.g., API 16). After deployment of parallel encoding applications (e.g., media encoders 46, 102, 122), each encoder is commanded via an encoder API (e.g., API 48) to encode a respective media sub-asset at 268. Each encode command can specify a given media sub-asset (e.g., corresponding to a specified block of the input media asset) as well as encoder parameters determined by the analysis for use in encoding the given sub-asset. The encoder parameters can specify buffer utilization constraints for a given media sub-asset. Each of the encoders thus processes and encodes the set of media sub-assets in parallel. Audio for the input media asset can also be encoded (e.g., by audio encoder 112 or 132) concurrently with the video encoding. Each parallel encoder can provide status that is received at 270. Upon completion of the encode process for each of the parallel encode encoders being implemented the method can proceed to 272.

At 272, a combiner virtual machine can be created. Upon deployment of the combiner application, the combiner is commanded to aggregate the encoded media sub-assets that have been generated by each parallel encoder. The sub-assets can be packaged into an appropriate container according to the encode request. Upon completion of the aggregation of the media asset, including audio and video content and any other related content (e.g., audio, streams and captioning) at 276 the combiner status is received to indicate that the encoding process has completed.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims.

Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. The term "based on" means based at least in part on.

What is claimed is:

1. A system comprising:
a memory storage; and
a processing unit coupled to the memory storage, the processing unit being operative to execute a controller logic that employs an application interface to create and manage resources in a resource pool for encoding or transcoding an input media asset, wherein the controller logic, using the application interface, is operative to:
create a media splitter to divide the input media asset into a plurality of media blocks;
create a plurality of media analyzers to analyze the plurality of media blocks, wherein the controller logic is operative to assign the plurality of media analyzers to analyze media content in each of the plurality of media blocks in parallel, wherein the plurality of media analyzers are operative to:
detect a scene change in a media block of the plurality of media blocks,
send a notification to the controller logic of the detected scene change, and
determine respective encoding parameters for each of the plurality of media blocks based on a complexity and buffer utilization;
create, in response to the notification of the detected scene change, an additional media splitter to split the media block comprising the detected scene change into at least two media sub-blocks at the detected scene change;
create at least two additional media analyzers to analyze the at least two media sub-blocks in parallel, wherein the at least two additional media analyzers are operative to determine the respective encoding parameters for the at least two media sub-blocks; and
create a plurality of encoders to encode, in parallel with each other, each of the plurality of media blocks and the at least two media sub-blocks based on the determined encoding parameters to provide encoded media blocks in a target format.

2. The system of claim 1, wherein the controller logic is further operative to create a combiner to aggregate the encoded media blocks in a sequence to provide an aggregate encoded media file representing the input media asset.

3. The system of claim 1, wherein the media splitter further subdivides one or more media blocks to provide a set of subdivided media blocks based on at least one divide location specified by the controller logic via a splitter application interface, and wherein the plurality of media analyzers are operative to analyze the media content in a respective one of the subdivided media blocks to determine the encoding parameters.

4. The system of claim 3, wherein the encoding parameters for each of the subdivided media blocks comprises a bandwidth utilization parameter for use in encoding each respective subdivided media block.

5. The system of claim 4, wherein the bandwidth utilization parameter of at least one of the subdivided media blocks is different from another of the subdivided media blocks.

6. The system of claim 1, wherein the plurality of media analyzers being provisioned by the controller logic to analyze the media content of a respective one of the plurality of media blocks and provide respective encoding parameters.

7. The system of claim 1, wherein the resource pool comprises a computing cloud, wherein the controller logic employs the application interface to employ a plurality of virtual machines to create each of the plurality of media analyzers.

8. The system of claim 7, wherein the controller logic employs the application interface to create another plurality of virtual machines to create the media splitter and commands the media splitter to subdivide a given one of the media blocks into multiple media sub-blocks and generate splitter data that represents split locations and associated metadata for each of the multiple media sub-blocks based on at least one divide locations specified in analysis data generated by the media analyzer for the given one of the media blocks.

9. The system of claim 8, wherein the controller logic employs the cloud application interface to create yet another plurality of virtual machines to create another plurality of media analyzers based on the splitter data, each of the another plurality of media analyzers analyzing media content in a respective one of the multiple media blocks to determine the encoding parameters for encoding the given one of the media blocks based on the complexity thereof.

10. The system of claim 1, wherein each of the plurality of encoders comprises an adaptive bitrate encoding node that encodes a given one of the plurality of media blocks to a plurality of bitrates based on the respective encoding parameters for the given one of the plurality of media blocks and according to parameters specified in an encoder request to encode or transcode the input media asset.

11. The system of claim 1, wherein the controller logic is further operative to create an audio encoder that encodes or transcodes audio in the input media asset to provide encoded output audio, the audio encoder encoding or transcoding the audio separately from video that is encoded by the plurality of encoders.

12. A method comprising:
creating a media splitter to split an input media asset into a plurality of media blocks;
creating a plurality of media analyzers to analyze media content in each of the plurality of media blocks to provide analyzer data, wherein the plurality of media analyzers are operative to detect a scene change location in a media block of the plurality of media blocks;
creating, in response to detecting the scene change location, an additional media splitter, wherein the additional media splitter is configured to split the media block into at least two media sub-blocks at the detected scene change;
creating at least one additional media analyzer to analyze the at least two media sub-blocks in parallel, wherein the plurality of media analyzers and the addition media analyzer are configured to determine encoding parameters based the scene change location and a complexity determined for each of the plurality of media blocks and the at two media sub-blocks;
creating a plurality of encoders to encode each of the plurality of media blocks and media sub-blocks separately and in parallel with each other to provide a plurality of encoded media blocks; and
creating a media combiner to combine the encoded media blocks to provide an encoded media file in a target format for the input media asset.

13. The method of claim 12, further comprising recursively looping to perform at least one of the splitting or the analyzing in response to determining that further media analysis or splitting is required such that an increasing number of the plurality of media sub-assets are provided with each recursive loop.

14. The method of claim 12, wherein creating the plurality of encoders comprises deploying a plurality of encoder nodes, each of the plurality of encoder nodes encoding a respective one of the plurality blocks.

15. The method of claim 14, wherein each of the plurality of encoder nodes comprises an adaptive bitrate encoding node that encodes a respective one of the plurality of media blocks to a plurality of bitrates based on the respective encoding parameters for the given one of the plurality of media blocks and according to parameters specified in the encoder request to encode or transcode the input media asset.

16. The method of claim 12, wherein creating the plurality of media analyzers comprises creating a plurality of media analyzer nodes to perform the analyzing in parallel, each of the plurality of media analyzer nodes providing the encoding parameters to include a bandwidth utilization level based on the complexity.

17. An apparatus comprising:
a memory storage; and
a processing unit coupled to the memory storage, the processing unit operative to:
create a media splitter to divide the input media asset into a plurality of media assets;
create a plurality of media analyzers to analyze the plurality of media assets, each of the plurality of media analyzers analyzing media content in a given media asset of the plurality media assets, wherein the plurality of media analyzers are operative to detect a scene change location in a media asset, and provide corresponding analysis data specifying the scene change location for further subdividing the media asset;
create, in response to the detection of the scene change, an additional media splitter to split the media block into the at least two media sub-blocks at the detected scene change;
create at least one additional media analyzers to analyze the at least two media sub-blocks in parallel, wherein the plurality of media analyzers and the addition media analyzer are configured to determine encoding parameters for the encoding or transcoding of the plurality of media assets; and
create a plurality of media encoders to encode or transcode each of the plurality of media assets separately and in parallel with each other of the media encoders, and provide a plurality of encoded media blocks.

18. The apparatus of claim 17, wherein the processing unit is further operative to create a combiner to aggregate the plurality of encoded media blocks into a corresponding encoded media file according to a container format specified in the encode request.

19. The apparatus of claim 17, wherein the processing unit is further operative to recursively loop to perform at least one of the splitting or the analyzing in response to determining that further media analysis or splitting is required such that an increasing number of the plurality of media sub-assets are provided with each recursive loop.

20. The apparatus of claim 17, wherein the processing unit is further operative to create an audio encoder that encodes or transcodes audio in the input media asset to provide encoded output audio, the audio encoder encoding or transcoding the audio separately from video that is encoded by the plurality of encoders.

* * * * *